(12) United States Patent  (10) Patent No.: US 8,409,324 B1
Straub et al.  (45) Date of Patent: Apr. 2, 2013

(54) SWEEP GAS FOR MEMBRANE-BASED DEHYDRATION MODULES

(71) Applicant: Generon IGS, Inc., Houston, TX (US)

(72) Inventors: Marc Straub, Brentwood, CA (US); John A. Jensvold, Benicia, CA (US); Raymond K. M. Chan, San Francisco, CA (US)

(73) Assignee: Generon IGS, Inc., Houston, TX (US)

( * ) Notice: Subject to any disclaimer, the term of this patent is extended or adjusted under 35 U.S.C. 154(b) by 0 days.

(21) Appl. No.: 13/681,696

(22) Filed: Nov. 20, 2012

Related U.S. Application Data

(62) Division of application No. 12/698,543, filed on Feb. 2, 2010.

(51) Int. Cl.
*B01D 53/22* (2006.01)
(52) U.S. Cl. .................... 95/8; 95/45; 95/52; 96/4; 96/8; 96/10; 96/417
(58) Field of Classification Search .............. 95/8, 10, 95/45, 46, 52; 96/4, 6, 8, 10, 417
See application file for complete search history.

(56) References Cited

U.S. PATENT DOCUMENTS

| | | |
|---|---|---|
| 4,386,944 A | 6/1983 | Kimura |
| 4,934,148 A | 6/1990 | Prasad |
| 5,169,412 A | 12/1992 | Prasad |
| 5,226,932 A | 7/1993 | Prasad |
| 5,447,559 A | 9/1995 | Rao |
| 6,136,073 A * | 10/2000 | Coan et al. ............... 96/8 |
| 6,485,545 B1 | 11/2002 | Ohlrogge |
| 6,669,177 B2 | 12/2003 | Shimanuki |
| 7,497,895 B2 | 3/2009 | Sabottke |
| 7,517,388 B2 * | 4/2009 | Jensvold ............... 95/45 |
| 2008/0006156 A1 | 1/2008 | Reeve et al. |
| 2008/0223212 A1 | 9/2008 | Crowder et al. |

FOREIGN PATENT DOCUMENTS

| | | |
|---|---|---|
| DE | 19812960 C1 | 11/1999 |
| JP | 2001-96124 | 4/2001 |

* cited by examiner

*Primary Examiner* — Jason M Greene
(74) *Attorney, Agent, or Firm* — William H. Eilberg

(57) ABSTRACT

An air dehydration membrane module is provided with a sweep gas which is taken from the waste gas of a pressure swing adsorption (PSA) unit. No additional compressor is required, other than the compressor forming part of the PSA unit. In another embodiment, the sweep gas includes the combination of dried product gas, taken from the dehydration membrane module, and a supplemental gas, which may be ambient air, or permeate gas from an air separation membrane, or waste gas from a PSA unit. An air ejector combines the streams, without the use of an additional compression step, and the combined gas is used as a sweep stream for the dehydration module. The invention also includes the method of selecting an optimum point at which the sweep gas is injected into the module.

4 Claims, 3 Drawing Sheets

SWEEP GAS FOR MEMBRANE-BASED DEHYDRATION MODULES

CROSS-REFERENCE TO PRIOR APPLICATION

This is a division of U.S. patent application Ser. No. 12/698,543, filed Feb. 2, 2010.

BACKGROUND OF THE INVENTION

This invention pertains to the drying of wet feed gases. In particular, the invention provides various techniques for making a sweep gas for use in a membrane-based dehydration module.

Polymeric membranes have been shown to be effective for the removal of condensable gases, especially water, from otherwise desirable gas streams. A membrane module, containing a plurality of polymeric fibers, is typically used to dry a wet air stream, thereby providing dry air for use in a subsequent process.

The effectiveness of a membrane in gas separation depends not only on the inherent selectivity of the membrane, but also on its capability of handling a sufficiently large product flow. Gas permeates through the membrane due to the pressure differential between one side of the membrane and the other. Thus, to maintain the pressure differential, it is advantageous to remove the permeate gas from the vicinity of the fibers, after such gas has permeated through the fibers. Removal of the permeate gas maximizes the partial pressure difference across the membrane, with respect to the permeate gas, along the length of the module, thus improving both the productivity and recovery of the module.

The removal of the permeate gas is typically accomplished with a "sweep" stream, i.e. a stream of gas which carries the permeate gas away from the module. The sweep gas may also dilute the permeate gas, reducing its partial pressure, and further assisting in the removal of permeate gas from the module.

More details concerning sweep streams are provided in U.S. Pat. No. 7,517,388, the disclosure of which is incorporated by reference herein.

The present invention relates to the use of a membrane module for air dehydration. That is, the material of the membrane is chosen such that it separates air from water vapor, thereby drying the air. In this case, the dried air is the finished product of the dehydration membrane module, and it may be sufficient to divert some of the product gas for use as a sweep stream for the permeate gas produced by the module. U.S. Pat. No. 4,934,148, the disclosure of which is incorporated by reference herein, shows several examples of such a system.

In other cases, it is desirable to use a permeate stream from a second membrane unit to provide sweep gas to the permeate side of the first membrane, thereby avoiding the loss of product gas. U.S. Pat. No. 5,169,412, the disclosure of which is incorporated by reference herein, shows such a system.

In still other cases, the second permeate stream is recompressed and used as a sweep stream to remove the permeate gas from the first membrane. U.S. Pat. No. 5,226,932, the disclosure of which is incorporated by reference herein, uses a vacuum on the permeate side of the membrane to increase the partial pressure of the permeate gas and thereby enhance the effectiveness of the drying process.

What is needed is an effective and cost-efficient process to remove the permeate stream from a dehydration membrane.

In general, whether one uses the dried product gas as a sweep gas, or whether one uses ambient air, it is necessary to compress the gas before using it to sweep the permeate gas from the module. Alternatively, one could draw the sweep gas through the desired module by providing a vacuum at the low-pressure discharge side of the module. Both of the above approaches incur the cost of operating a compressor. Alternatively, it is possible to remove water from air by using a refrigeration dryer, but the refrigeration process also consumes power.

The present invention solves the above-described problems by providing an improved method and apparatus for generating a sweep gas for a dehydration module. The present invention minimizes the operating cost of generating a sweep gas, by avoiding the need for additional energy-consuming gas compression steps.

SUMMARY OF THE INVENTION

In one embodiment, the present invention comprises a system for drying a feed gas and for producing a purified product gas, the product gas being a component of the feed gas. The system comprises an air dehydration membrane module and a pressure swing adsorption (PSA) unit connected to receive product gas from the dehydration membrane module, the PSA unit providing a product stream and a waste stream. The waste stream from the PSA unit is connected, through a buffer, to the dehydration membrane module, so that the waste stream can function as a countercurrently flowing sweep gas for the module. The term "countercurrent" means that the sweep gas flows in a direction opposite that of the feed gas entering the module. The system requires no compressor, other than that which is included in the PSA unit.

The invention also includes the method of making a dry component gas from a relatively wet feed stream, the method comprising passing the feed stream through a dehydration membrane module to derive a dry product gas, directing the dry product gas into a PSA unit so as to separate the dry product gas into a purified product gas and a waste stream, and conveying the waste stream from the PSA unit into the dehydration membrane module, the waste stream comprising a countercurrently flowing sweep gas for the module.

In another embodiment, the present invention is a gas drying system including an air dehydration membrane module, and an air ejector unit connected to receive dried gas from the product end of the module. The air ejector is also connected to receive, simultaneously, a supplemental gas from another source. The air ejector aspirates the supplemental gas, and ejects a combined stream on its outlet side. A conduit directs the combined stream to the module, such that the combined stream comprises a countercurrent sweep stream for the dehydration membrane module. The system requires no compressor; the air ejector unit uses gas which has previously been compressed, and still is at a pressure higher than ambient, to entrain the streams so as to produce a usable sweep stream.

The invention also includes a method of drying a wet gas, comprising passing a feed gas stream through a dehydration membrane module, to produce a dry product gas, entraining a portion of the dry product gas with a supplemental gas from a source, so as to produce a combined gas, and conveying the combined gas into the dehydration membrane, the combined gas functioning as a countercurrently flowing sweep stream for the dehydration module. The entraining step is preferably performed with an air ejector which requires no separate compressor.

Another embodiment of the present invention comprises a method of providing a sweep gas for a dehydration membrane module. The method includes providing a sweep stream for the module, determining the water vapor concentration of the sweep stream, calculating the water vapor concentration of the feed gas stream flowing within the module, at a plurality of locations along the module, and injecting the sweep stream at a location along the module such that the water vapor concentration of the feed gas stream at such location is greater than or equal to the water vapor concentration of the sweep stream. The sweep stream is injected so as to flow countercurrently to the flow of the feed gas stream. Due to the inherent characteristics of a dehydration membrane module, the sweep stream encounters feed gas having a water vapor concentration which tends to increase in the direction of the feed end of the module.

The present invention therefore has a primary object of providing a sweep gas for a dehydration membrane module.

The invention also has an object of enhancing the production of dried gas with a dehydration membrane module, by using a sweep gas which is formed in an economical manner.

The invention has the further object of reducing the cost of producing dried gas, by using waste gas from a PSA unit as a sweep stream for a dehydration membrane module, and thereby avoiding the need for an additional compression step.

The invention has the further object of reducing the cost of producing dried gas, by entraining a dry gas with a supplemental gas, without the use of a separate compression step, so as to make a sweep gas for a dehydration membrane module.

The invention has the further object of providing a method of selecting an optimum point of injection for a sweep stream in a dehydration membrane module.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
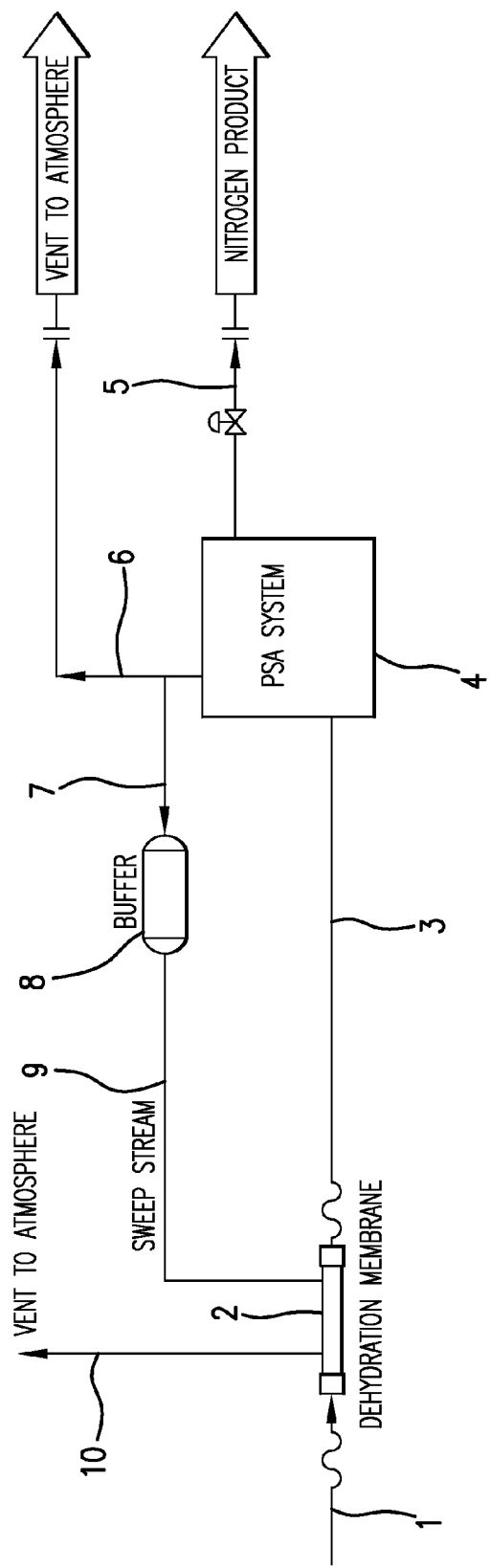
FIG. 1 provides a schematic diagram of one embodiment of the system of the present invention.

FIG. 1 provides a schematic diagram of one embodiment of the present invention, in which a pressure-swing adsorption (PSA) system is used to supply a sweep gas for a dehydration module.

A PSA system typically includes two chambers, each having a bed of material which selectively adsorbs components of a gas when the gas is under pressure. In a PSA system, a gas to be separated is passed, under pressure, into the first chamber, and one component of the gas tends to be adsorbed by the material. The non-adsorbed component(s) can then be removed from the chamber. When the first chamber is depressurized, the adsorbed gas tends to be released from the bed. While the first chamber is pressurized, the second chamber is depressurized, and vice versa, so as to maximize the portion of the cycle during which the desired gas is produced. In general, one of the components is deemed the product component, and the other component is deemed waste.

Note that the PSA system used in the present invention, and represented by block 4 in FIG. 1, is assumed to include all of the above-described components, including the chambers, the adsorbent beds, and the compressors. Therefore, these components are not shown explicitly in the figure.

In PSA systems of the prior art, the waste component is simply vented to the atmosphere, or otherwise discarded. The product gas is collected, and is often recompressed for use in another process that requires purified gas.

In the present invention, the waste gas of the PSA system is collected and used as a sweep gas for the membrane dehydration system. This waste gas, having been previously pressurized, retains some of its pressure, typically about 4-8 psig, and this is enough to allow the waste gas to be used as a sweep gas for the membrane module.

The above concepts are illustrated in FIG. 1. Air to be dried flows through conduit 1, into the feed end of dehydration membrane module 2. The dehydration module contains polymeric fibers suitable for removing water vapor from the input gas stream. The module also includes suitable baffling (not shown) such that the permeate gas, having permeated through the fiber membranes, can reverse direction and flow back towards the inlet or feed end of the module. That is, the module includes means for providing countercurrent flow within the module. It is the sweep stream that aids this countercurrent flow, and helps to remove the permeate gas from the vicinity of the module.

The output of the dehydration module 2, namely the non-permeate gas, flows through conduit 3, and into PSA system 4. In the system shown in FIG. 1, if the feed gas is wet air, the non-permeate product gas is dried air. As explained above, the PSA system includes chambers having the necessary adsorbent material, and means (such as a compressor) for pressurizing incoming gas. The product gas flows out through conduit 5. The waste gas can flow out through vent 6. In the example of FIG. 1, the product gas is nitrogen, or nitrogen-enriched air, and the waste gas is oxygen, or oxygen-enriched air. In a more general case, the product and waste streams could be other materials.

In the present invention, some or all of the waste gas flowing through vent 6 is directed through conduit 7, and into buffer 8. The buffer is simply a tank capable of storing gas. The waste gas from the buffer is directed through conduit 9, and is directed into the shell side of dehydration membrane module 2, at or near the product end of the module, so that the waste gas comprises a sweep stream for the module. The sweep gas is then vented to the atmosphere, or otherwise discarded, through vent 10.

Thus, the waste gas of the PSA system, which would otherwise be discarded, is used to advantage as a sweep stream. Because this waste gas has a pressure which is still above atmospheric pressure, due to previous compression steps, it can be readily conveyed to the membrane module, and used as a sweep gas. Thus, the system shown in FIG. 1 does not need any additional compressor, beyond what is included in PSA system 4, and beyond any compressor used to compress the feed gas entering membrane module 2.

The buffer 8 is an optional component. It could be omitted entirely. Alternatively, the apparatus could be provided with a bypass line (not shown), disposed around the buffer, which would effectively allow an operator to add or remove the buffer from the system.

The system shown in FIG. 1 therefore comprises a system for both drying an incoming wet feed stream, and for providing a purified product gas, such as nitrogen or oxygen.

Figure 2:
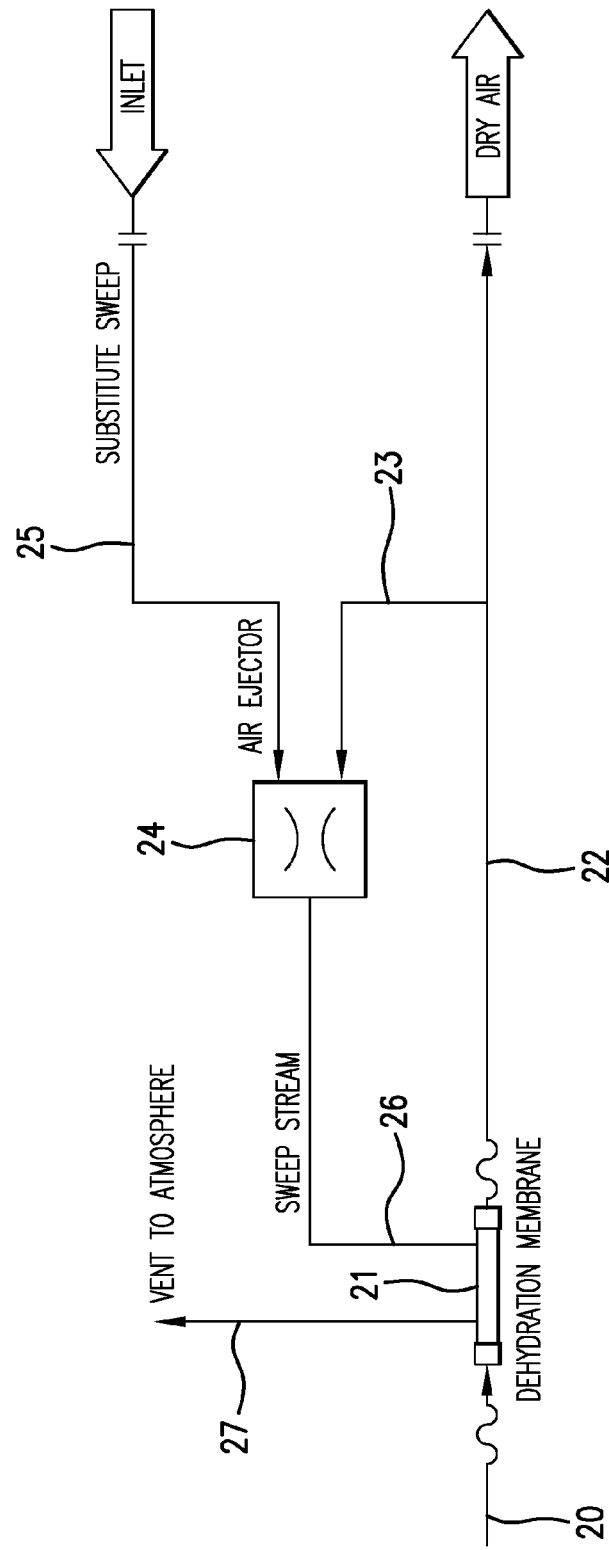
FIG. 2 provides a schematic diagram of another embodiment of the system of the present invention.

FIG. 2 illustrates another embodiment of the invention, in which an air ejector is used to provide a sweep gas for a dehydration module.

The incoming gas stream flows through conduit 20, and into dehydration membrane module 21. The product gas, i.e. dried gas, flows through conduit 22. A portion of the product gas is diverted into conduit 23, which directs that gas into air ejector 24. The air ejector, also known as a vacuum ejector, is commercially available, and is represented by a symbol showing that it provides a venturi, followed by a region of expanding volume, for gas flowing through the ejector. The air ejector or vacuum ejector may be of the type sold by SMC Corporation, of Tokyo, Japan, under the trademark SERIES ZH, or its equivalent.

The air ejector is also connected to receive a supplemental gas from conduit 25. The gas in conduit 25 could be ambient air, or permeate gas from an air separation membrane, or vent gas from a PSA system. In each case, the gas in conduit 25 becomes entrained with the gas from conduit 23, to form a combined gas. This combined gas is ejected into conduit 26, and directed into the dehydration membrane for use as a sweep stream. The air ejector does not have any moving parts, but uses the pressure of the product gas of the dehydration membrane, and the pressure of the gas flowing in from conduit 25, to create a gas having sufficient pressure above ambient to function as a sweep gas. The air ejector draws in only a fraction of the high pressure product stream flowing in conduit 22 to aspirate the secondary stream from conduit 25. After passing through the dehydration module, the sweep gas is discarded through vent 27.

While the combined stream formed of the streams in conduits 25 and 23 may contain more water vapor than if one used, as a sweep stream, a pure product stream, the advantage of the system shown in FIG. 2 is that the additional dry sweep gas can be provided at essentially no additional cost. For cases in which the desired product dew point is about 40° F. (at pressure), the use of supplemental ambient air, or of waste gas vented from a downstream air separation device, can be used satisfactorily.

EXAMPLE

An air dehydration module, available commercially from Generon IGS, Inc., of Houston, Tex., having the model number 4100GMD-123, was operated using both a conventional product sweep stream and one in which an air ejector was used to make a combined product gas and ambient air sweep stream. At a target 43° F. pressure dew point (equivalent to a dew point of about 4° F. at atmospheric pressure), one uses 12% less vented compressed air for a given amount of net product air produced. Shown below are the results for a typical module operating at 100 psi.

| Ejector Used? | Permeation Flow (% of feed) | Product Sweep Flow (% of Feed) | Total Compressed Air Requirement for Purge (% of Feed) | Ambient Air in Sweep (% of Feed) | Module Pressure Drop |
|---|---|---|---|---|---|
| No | 2.9 | 5.5 | 8.4 | 0 | 7.38 psi |
| Yes | 3.1 | 4.2 | 7.3 | 1.7 | 6.61 psi |

Thus, the use of the air ejector reduces the total compressed air requirement by about 13%. Therefore, the power cost is reduced by the same percentage. The module pressure drop was reduced by about 10%.

The above results were obtained with an ambient stream having an atmospheric dew point of about 45° F. This is greater than the 4° F. atmospheric dew point of the product stream, so one does pay some penalty, with regard to some performance, but the reduction in performance is more than outweighed by the reduction in the compressed air requirement. For this Example, the module produced 9% more net product gas at 43° F. pressure dew point when the ejector was not used (82.3 versus 75 scfh), but it used 20% more compressed air in total purge losses. The pressure quality of the product gas was also better in the case in which the ejector was used, in that the pressure drop on the high pressure side of the module was about 10% less for this case.

The invention can be further improved by using different ejectors in which the aspirated stream is a greater fraction of the combined air ejector output stream. The above Example had an aspiration stream that was about 28% of the total output stream, while other commercially available air ejectors can aspirate up to 60% of the total output stream.

Figure 3:
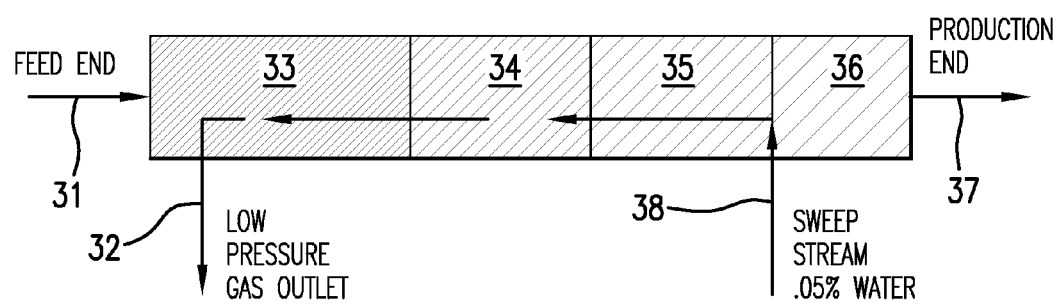
FIG. 3 provides a schematic diagram illustrating a method wherein sweep gas is introduced at varying locations, according to another aspect of the present invention.

Another embodiment of the present invention is the optimal injection of the sweep stream on the low pressure side of the membrane, at a position along the module which maximizes the water vapor driving force. This embodiment is illustrated in FIG. 3, and is described below.

When an air dehydration module is operated without a sweep stream, the water vapor concentration on the low pressure side of the module will be steadily drier as one proceeds along the length of the module from the feed end to the product end. But the water vapor concentration will still be greater than that of the gas on the high pressure side of the membrane at any particular point. Water vapor permeates very quickly through the membrane wall, so water vapor on the low pressure side of the membrane is greatest near the feed end of the module, where the water concentration is the greatest in the feed stream.

As the gas is further dried along the length of the module, the gas permeating to the low pressure side will be drier as well. When the sweep stream consists only of the dry product gas, it will be satisfactory as a sweep gas for the entire length of the module, because it has lower water content than any gas being permeated along the length of the module. That is, in this case, the partial pressure differential of water vapor, between the bore side and the shell side of the membrane is maintained.

But when the sweep gas is obtained, in whole or in part, from another source, the above statement may not always be true. For example, if the sweep stream is taken from the waste gas of a PSA system, or a combination of product gas and aspirated ambient or waste gas from a PSA system or membrane permeate gas, the sweep stream may have a greater water content than the product gas of the dehydration membrane.

When the sweep stream has a greater water vapor content than the product gas alone, it should be used as a sweep stream only in that portion of the module in which the water vapor concentration of the permeate gas is greater than the water vapor concentration of the sweep stream. This is the portion of the module that can benefit from the sweep stream.

If one introduces the sweep stream in a region of the module that would otherwise, without a sweep, have lower water vapor content than the sweep, then the use of the sweep stream would actually diminish the net water vapor driving force for permeation in those regions, and the module would perform less efficiently.

By applying the sweep stream at those positions that would normally contain the same or greater water vapor concentration than that of the sweep stream, one will obtain a net benefit to the air dehydration process.

The membrane devices are operated with countercurrent flow patterns such that one only needs to calculate the point in the module where the water vapor concentration on the low pressure side is the same as that of the sweep stream. Once this point is determined, then all areas from this point to the feed end of the module should receive the sweep stream. One would not want to provide the sweep stream to those areas on the product side of this critical point. The point of injection of the sweep stream should be moved further towards the feed end of the module until its water vapor concentration matches the water vapor concentration of the permeate stream at that position along the module.

The critical point can be estimated theoretically, based on the operation of the module, and on the dryness of the supplemental (aspirated) sweep gas. The determination of the water vapor concentration of permeate gas, at any point along the module, is well known to persons skilled in the art.

The procedure described above is illustrated more clearly in FIG. 3. FIG. 3 shows a dehydration module having feed end 31 and product end 37. The dehydration module contains regions 33, 34, 35, and 36. In each region, the permeate gas has a different amount of water vapor.

In one example, suppose that:
the water vapor content in region 33 is >1%,
the water vapor content in region 34 is >0.3% and <0.99%,
the water vapor content in region 35 is >0.05% and <0.29%, and
the water vapor content in region 36 is >0.01% and <0.049%.

In this example, if the sweep stream has a water vapor concentration less than 0.01%, then the sweep stream can be applied to the entire length of the module, including all of regions 33-36. If the sweep stream has a concentration of 0.05%, then only regions 33-35 should be swept. The latter case is explicitly illustrated in FIG. 3, where the sweep stream is injected through conduit 38, at the boundary between regions 35 and 36.

If the sweep stream has a water content of 0.3%, only regions 33 and 34 should be swept, and the sweep gas would be injected at or near the boundary between regions 34 and 35.

If the sweep stream has a water content of 1%, then the sweep stream should be applied only to region 33, and the sweep gas should be injected at or near the boundary between regions 33 and 34.

Note that gas can enter at only one point along the module and is then channeled countercurrently to the feed gas (i.e. to the left in FIG. 3). Thus, the sweep gas sweeps all areas to the left, i.e. upstream, and these are the areas that would benefit from the sweep stream. Alternatively, one could introduce the sweep stream in discrete locations at any position where the sweep stream has lower water vapor concentration than found at that location along the module.

The method for optimal injection, described above, can be used in various membrane-based dehydration systems, including the embodiments of FIGS. 1 and 2, and in other applications.

The invention can be further modified in various ways, which will be apparent to the reader skilled in the art. Such modifications should be considered within the spirit and scope of the following claims.

What is claimed is:

1. A method for making a dry component gas from a relatively wet feed stream, the method comprising:
    a) passing a feed gas stream through a dehydration membrane module, the module having a feed end and a product end, to produce a dry product gas,
    b) directing the dry product gas into a PSA unit so as to separate the dry product gas into a purified product gas and a waste stream, and
    c) conveying said waste stream from the PSA unit into the dehydration membrane, the waste stream being conveyed to a point in a vicinity of the product end such that the waste stream can flow countercurrently to the feed gas stream and can function as a sweep gas for the dehydration module,
    wherein step (c) includes selecting an injection point along the module, for the sweep gas, according to the following steps:
    d) determining a water vapor concentration of said sweep gas,
    e) calculating a water vapor concentration of said feed gas stream flowing within the module, the calculating step being performed for a plurality of locations along the module, and
    f) injecting the sweep gas at a location along the module such that the water vapor concentration of said feed gas stream at said location is greater than or equal to the water vapor concentration of said sweep stream.

2. A method for drying a wet gas, the method comprising:
    a) passing a feed gas stream through a dehydration membrane module, the module having a feed end and a product end, to produce a dry product gas,
    b) entraining a portion of the dry product gas with a supplemental gas from a source, so as to produce a combined gas, and
    c) conveying said combined gas into the dehydration membrane, the combined gas being conveyed to a point in a vicinity of the product end such that the combined gas functions as a sweep stream which flows countercurrently to the feed gas stream of the dehydration module,
    further comprising selecting a location for said point according to the following steps:
    d) determining a water vapor concentration of said sweep stream,
    e) calculating a water vapor concentration of said feed gas stream flowing within the module, the calculating step being performed for a plurality of locations along the module, and
    f) injecting the sweep stream at a location along the module such that the water vapor concentration of said feed gas stream at said location is greater than or equal to the water vapor concentration of said sweep stream.

3. A method of providing a sweep gas for a dehydration membrane module, the module having a feed end and a product end, wherein a feed gas stream containing water vapor flows through the module such that some of the water vapor permeates through a membrane in the module, the method comprising:
    a) providing a sweep stream for the dehydration membrane module,
    b) determining a water vapor concentration of said sweep stream,
    c) calculating a water vapor concentration of said feed gas stream flowing within the module, the calculating step being performed for a plurality of locations along the module, and
    d) injecting the sweep stream at a location along the module such that the water vapor concentration of said feed gas at said location is greater than or equal to the water vapor concentration of said sweep stream, the injecting being performed such that the sweep stream flows countercurrently to a flow of said feed gas.

4. The method of claim 3, further comprising selecting said sweep stream from the group consisting of ambient air, permeate gas from an air separation membrane, and vent gas from a pressure swing adsorption unit.

* * * * *